United States Patent
Williams

(10) Patent No.: US 10,539,647 B2
(45) Date of Patent: Jan. 21, 2020

(54) METHOD AND SYSTEM FOR DETERMINING PRECISE ROBOTIC POSITION AND ORIENTATION USING NEAR-SIMULTANEOUS RADIO FREQUENCY MEASUREMENTS

(71) Applicant: Discovery Robotics, Pittsburgh, PA (US)

(72) Inventor: Larry J. Williams, Pittsburgh, PA (US)

(73) Assignee: Discovery Robotics, Pittsburgh, PA (US)

( * ) Notice: Subject to any disclaimer, the term of this patent is extended or adjusted under 35 U.S.C. 154(b) by 288 days.

(21) Appl. No.: 15/632,718

(22) Filed: Jun. 26, 2017

(65) Prior Publication Data

US 2018/0024223 A1  Jan. 25, 2018

Related U.S. Application Data

(62) Division of application No. 14/590,597, filed on Jan. 6, 2015, now Pat. No. 9,722,640.

(51) Int. Cl.
*B25J 9/10* (2006.01)
*G01S 5/02* (2010.01)
(Continued)

(52) U.S. Cl.
CPC .............. *G01S 5/0289* (2013.01); *B25J 5/007* (2013.01); *B25J 13/089* (2013.01); *G01C 21/00* (2013.01);
(Continued)

(58) Field of Classification Search
CPC ........ G01S 5/0289; G01S 5/10; G01S 5/0263; G01S 19/48; G01S 19/42; G01S 13/0209;
(Continued)

(56) References Cited

U.S. PATENT DOCUMENTS

D369,008 S    4/1996 Campbell
6,157,873 A   12/2000 Decamp et al.
(Continued)

FOREIGN PATENT DOCUMENTS

EP   2752726 A1   7/2014
JP   2005046926 A  2/2005
(Continued)

OTHER PUBLICATIONS

"Avidbots Neo.", Avidbots Australia—Robotic Floor Scrubber, p. 1-4.
(Continued)

*Primary Examiner* — Adam R Mott
(74) *Attorney, Agent, or Firm* — GTC Law Group PC & Affiliates

(57) ABSTRACT

A method and system for determining position and/or pose of an object. A robotic device moves throughout an environment and includes a master transceiver tag and, optionally, additional tags. The environment includes a plurality of anchor nodes that are configured to form a network. A master anchor node is in communication with at least a portion of the plurality of anchor nodes and is configured to transmit a ranging message as a UWB signal, receive a ranging message response from each other anchor node in the network, generate a reference grid representing physical locations of the plurality of anchor nodes within the network based upon the received ranging message responses, and distribute the reference grid to each of the other anchor nodes. The master transceiver tag receives the reference grid information and, based upon further calculations, determines a specific position and pose of the robotic device within the environment.

9 Claims, 9 Drawing Sheets

(51) Int. Cl.
*H04B 1/00* (2006.01)
*G05D 1/02* (2006.01)
*G01C 21/00* (2006.01)
*B25J 5/00* (2006.01)
*B25J 13/08* (2006.01)
*G01S 13/02* (2006.01)
*G01S 19/42* (2010.01)

(52) U.S. Cl.
CPC .......... *G01S 13/0209* (2013.01); *G01S 19/42* (2013.01); *G05D 1/028* (2013.01); *G05D 1/0274* (2013.01); *H04B 1/0092* (2013.01); *Y10S 901/01* (2013.01)

(58) Field of Classification Search
CPC ........ G01C 21/20; G01C 21/00; B25J 13/089; B25J 5/007; G05D 1/028; G05D 1/0274; H04B 1/0092; Y10S 901/01
See application file for complete search history.

(56) References Cited

U.S. PATENT DOCUMENTS

| | | | |
|---|---|---|---|
| D482,171 S | 11/2003 | Vui et al. | |
| D508,508 S | 8/2005 | Burick | |
| D611,960 S | 3/2010 | Hansen et al. | |
| D633,443 S | 3/2011 | Wang et al. | |
| 8,063,825 B1 | 11/2011 | Yang et al. | |
| D654,159 S | 2/2012 | Chen et al. | |
| D659,919 S | 5/2012 | Lin | |
| D668,750 S | 10/2012 | Renfrew et al. | |
| 8,359,122 B2 | 1/2013 | Koselka et al. | |
| D675,680 S | 2/2013 | Long | |
| D700,923 S | 3/2014 | Lin et al. | |
| D701,546 S | 3/2014 | Lin et al. | |
| D712,604 S | 9/2014 | Jaeho et al. | |
| D721,460 S | 1/2015 | Hanan et al. | |
| D722,736 S | 2/2015 | Mongiori | |
| 9,043,012 B2 | 5/2015 | Davey et al. | |
| D734,211 S | 7/2015 | Ahn et al. | |
| 9,250,081 B2 | 2/2016 | Gutmann et al. | |
| D760,883 S | 7/2016 | Mann | |
| 9,506,263 B1 | 11/2016 | Lopez | |
| D782,759 S | 3/2017 | Mathiassen et al. | |
| D793,635 S | 8/2017 | Dammkoehler et al. | |
| 9,722,640 B2 | 8/2017 | Williams | |
| 9,888,820 B2 | 2/2018 | Martins et al. | |
| 2002/0049522 A1 | 4/2002 | Ruffner | |
| 2002/0156556 A1 | 10/2002 | Ruffner | |
| 2003/0012168 A1* | 1/2003 | Elson | G01D 9/005 370/338 |
| 2004/0076324 A1 | 4/2004 | Burl et al. | |
| 2006/0060216 A1 | 3/2006 | Woo | |
| 2007/0013510 A1 | 1/2007 | Yamada et al. | |
| 2007/0025456 A1 | 2/2007 | McCrady et al. | |
| 2007/0050937 A1 | 3/2007 | Song et al. | |
| 2007/0213952 A1 | 9/2007 | Cirielli et al. | |
| 2009/0228166 A1 | 9/2009 | Durkos et al. | |
| 2010/0164720 A1* | 7/2010 | Kore | H04L 63/107 340/541 |
| 2011/0202175 A1 | 8/2011 | Romanov et al. | |
| 2013/0138247 A1 | 5/2013 | Gutmann et al. | |
| 2015/0032252 A1 | 1/2015 | Galluzzo et al. | |
| 2015/0127149 A1 | 5/2015 | Sinyavskiy et al. | |
| 2015/0271991 A1 | 10/2015 | Balutis | |
| 2016/0091899 A1 | 3/2016 | Aldred et al. | |
| 2017/0303466 A1 | 10/2017 | Grufman et al. | |
| 2017/0312916 A1 | 11/2017 | Williams | |
| 2017/0344013 A1 | 11/2017 | Haegermarck et al. | |
| 2017/0364073 A1 | 12/2017 | Guy | |
| 2018/0009112 A1 | 1/2018 | Williams | |
| 2018/0065253 A1 | 3/2018 | Williams et al. | |
| 2018/0071918 A1 | 3/2018 | Angle et al. | |
| 2018/0120833 A1 | 5/2018 | Lindhe et al. | |
| 2018/0284786 A1 | 10/2018 | Moshkina-Martinson et al. | |
| 2018/0317728 A1 | 11/2018 | Tomlinson | |

FOREIGN PATENT DOCUMENTS

| | | |
|---|---|---|
| KR | 101059829 B1 | 8/2011 |
| WO | 2018013538 A1 | 1/2018 |

OTHER PUBLICATIONS

"Intellibot floor cleaning robot", Cleaning Matter—A hands-free future is here; http://www.cleaning-matters.co.uk/page_585713, p. 1-3.

"The FX250 Commercial Floor Cleaning Robot", Apr. 12, 2018, p. 1-2.

PCT/US18/47670, "International Application Serial No. PCT/US18/47670, Invitation to Pay Additional Fees and, Where Applicable, Protest Fee mailed Oct. 17, 2018", Discovery Robotics, 2 Pages.

PCT/US2017/041495, "International Application Serial No. PCT/US2017/041495, International Preliminary Report on Patentability and Written Opinion dated Oct. 23, 2017", Discovery Robotics, 29 Pages.

* cited by examiner

METHOD AND SYSTEM FOR DETERMINING PRECISE ROBOTIC POSITION AND ORIENTATION USING NEAR-SIMULTANEOUS RADIO FREQUENCY MEASUREMENTS

CROSS-REFERENCE TO RELATED APPLICATIONS

This application is a divisional of U.S. patent application Ser. No. 14/590,597 filed Jan. 6, 2015.

The above-identified application is incorporated herein by reference in its entirety.

BACKGROUND

The present application relates to determining a position of an object. More specifically, the present disclosure relates to methods and systems for accurately determining a position and a pose of a robotic system or end effectors associated with such a robotic system.

Various techniques are available for determining the position of an object, robotic or otherwise. For example, a global positioning system (GPS) uses precise clocks on-board orbiting satellites to provide points for ground-based multilateration of a particular object, having an accuracy of approximately 3 meters. Such positioning systems require direct signal reception from satellites, making them inappropriate for indoor or select outdoor situations where direct signal reception from a satellite is impossible to establish or maintain over an extended period of time.

Techniques to improve accuracy of GPS signals, such as differential or real-time kinematic (RTK) methods, are too expensive for the price point of most commercial robots such as cleaning robots or inventory control robots. Other techniques such as radio frequency (RF) receiver signal strength indication can be used indoors, but are only accurate to a few meters which may be too inaccurate for specific applications. With such uncertainty in basic location determination, the use of current location-based techniques from which to derive orientation or pose of a robot or its end effectors are ineffective.

The introduction of ultra-wideband (UWB) signaling techniques with timing accuracy to a fraction of a nanosecond and range accuracy to within a few centimeters offers the opportunity to use a relative positioning system in a coordinated fashion to establish the orientation and/or the pose of a robot or of an end effector that may not be rigidly coordinated with the basic robotic orientation.

However, various prior analysis and techniques for determining position using UWB signals require that the precise position of any reference objects or anchors be fully known beforehand, e.g., in a laboratory environment. Further, the scope of the prior UWB signal approaches is limited to the objective of using ranging to determine the location of a single point in space, rather than a full description of, for example, a robot location and pose.

In real-time location determinations, such requirements do not cover the practical applications of establishing UWB ranging-based reference frames, and do not reflect determinations of a robot position and pose without additional types of sensors (e.g., non-UWB based). Furthermore, map generation for a specific area based upon measuring locational information related to a moving robot fails to establish a relationship between generated maps to the actual UWB reference frames. Similarly, the map generation fails to describe the use of digital map features to include characteristics that could influence command of the robotic pose such as specific poses a robot should take in relation to a specific object located within the generated map. Additionally, prior techniques have generally been restricted to co-planar objects that do not require more complex three-dimensional location sensing, estimating or pose determination.

SUMMARY

The present disclosure relates to a robotic localization and orientation system that uses near-simultaneous RF measurements to integrate in near-real time individual Time Difference of Arrival (TDOA) estimates from multiple RF transmitter-receiver pairs to establish the locations of one or more individual tags mounted on a robot or end effector. Based upon these estimates, a robotic navigation system may accurately infer the location and the pose of the robot. The robotic navigation system may use the pose and location information in conjunction with a digital map to locate and orient the robot or end effector consistent with orientation guidance contained in the map. The map may be developed by a user with a staff or stylus equipped with multiple tags or a single tag in conjunction with other non UWB tags communicating with, for example, at least 3 anchors and computing devices with digital mapping software. The mapping software may also be used to annotate existing digital maps with specific robotic orientation directives.

In an embodiment, a method for determining a position and a pose of an object may include receiving an indication that a selected anchor node is to function as a master anchor node, transmitting a ranging message as an ultra-wideband (UWB) signal, receiving a ranging message response from each other anchor node in the network, generating a reference grid representing physical locations of the plurality of anchor nodes within the network based upon the received ranging message responses, and distributing the reference grid to each of the other anchor nodes.

In a further embodiment, a method for determining a position of a robotic device within an environment may include transmitting a request to join a network, the network comprising at least one master node and a plurality of anchor nodes, receiving distance information for at least a portion of the master node and the plurality of anchor nodes, and determining a physical location of the robotic device within the environment.

In a further embodiment, a system for determining a position and a pose of an object may include a robotic device configured to move throughout an environment, the robotic device comprising a master transceiver tag, the master transceiver tag comprising a processing device and a non-transitory computer readable medium operably connected to the processing device of the master transceiver tag and configured to store a first set of instructions. The system may further include a plurality of anchor nodes located throughout the environment and configured to form a network and a user-selected master anchor node in communication with at least a portion of the plurality of anchor nodes, the master anchor node comprising a processing device and a non-transitory computer readable medium operably connected to the processing device of the master anchor node and configured to store a second set of instructions. The second set of instructions may executed, cause the processing device of the master anchor node to transmit a ranging message as a UWB signal, receive a ranging message response from each other anchor node in the network, generate a reference grid representing physical locations of the plurality of anchor nodes within the network based upon the received ranging message responses, and distribute the reference grid to each of the other anchor nodes.

DETAILED DESCRIPTION

Figure 1:
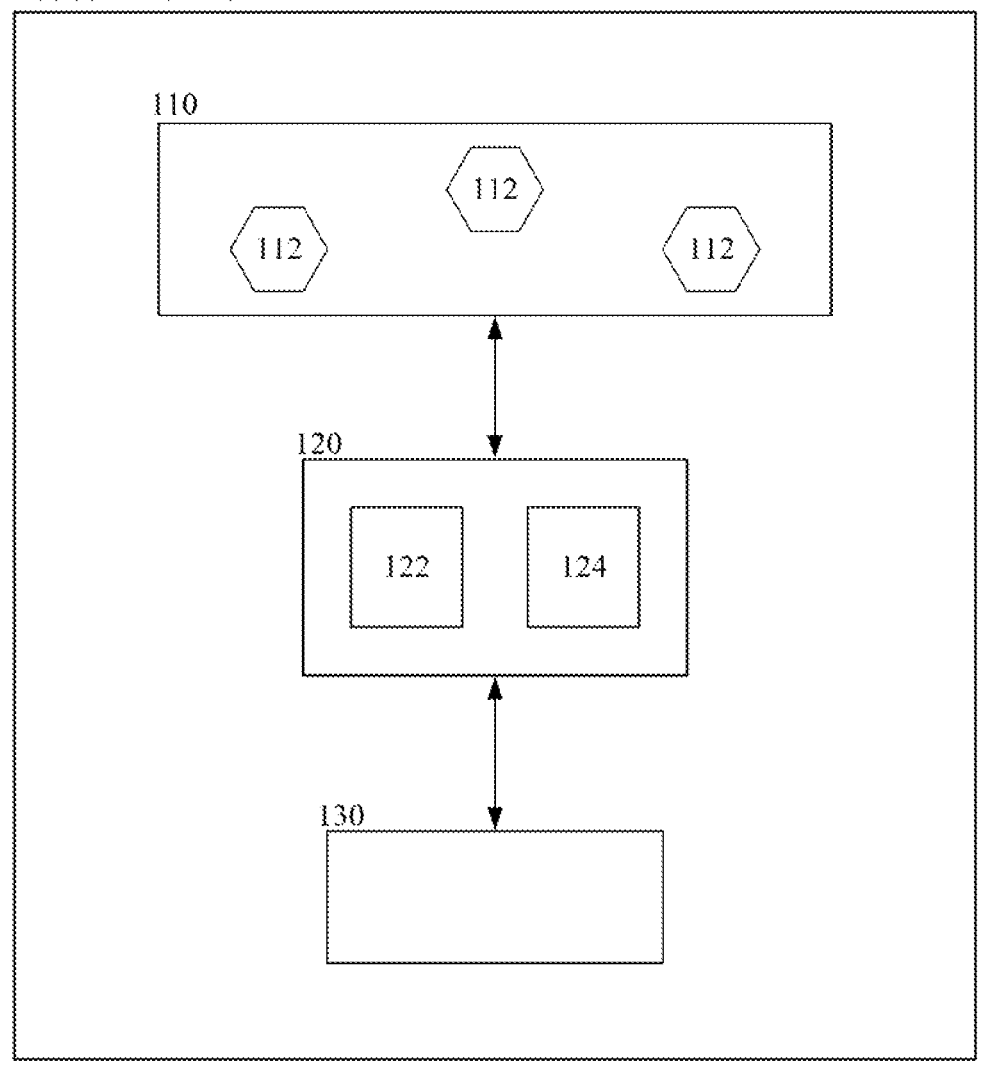
FIG. 1 depicts a system diagram showing a sample robot or robotic device according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

As used herein, an electronic device or computing device refers to a device capable of receiving and processing one or more computer instructions to produce an output or other result. The electronic device includes a processing device and a tangible, computer-readable memory or storage device. The memory may contain programming instructions that, when executed by the processing device, cause the device to perform one or more operations according to the programming instructions. Illustrative examples of electronic devices or computing devices include personal computers, mobile devices, integrated circuits, and other similar devices designed and configured to perform one or more operations.

A robot or robotic device refers to a stand-alone system, for example, that is mobile and performs both physical and computational activities. The physical activities may be performed using a wide variety of movable parts including various tools or other similar end effectors, for example. The computational activities may be performed using a suitable processor and one or more computer readable memory device, e.g., a data memory storage device. The computational activities may include processing information input from various sensors or other inputs of the robotic device to perform commanded functions; processing the input information, as well as other data in the memory stores of the robotic device, to generate a variety of desired information; or outputting information that has been acquired or produced by the robotic device to a desired destination, for example.

A pose refers to both the location and the 3-dimensional orientation of a robot and/or its end effector.

The present disclosure includes several methods and systems that, when taken together or in some combination, provide the ability to accurately estimate and direct a robot's or end effector's pose through the use of ultra wideband (UWB) signals and modern communication protocols. Using similar techniques, a handheld stylus and computing platform may be used to generate digital maps that provide information for robotic navigation including constraints to enable a specific robot pose or pose adjustments to accommodate specific tasks such as cleaning or inventory management.

The methods and systems as described herein may be implemented in a wide range of computer processing environments depending on the accuracy desired and additional planning functionalities. The programming languages may vary by user preference and technological advancements. The system and flow diagrams as provided and described herein may be implemented as illustrated or combined in various fashions to accommodate specific software architectures.

In general, four areas of art have a significant impact on such location determination: (1) RF ranging; (2) the IEEE 802.15.4-2011 protocol standard; (3) multi-lateration methods; and (4) geometric dilution of precision techniques. An overview of the IEEE 802.15.4a standard describes available framing structure options and an echo mode that can support UWB ranging. To accomplish ranging with a state-of-the-art UWB radio, an anchor or master node may activate a logical slave node by transmitting a unique slave identity code. Upon receiving the identity code, the slave node may switch into an echo mode for a fixed time period during which, after a fixed time delay, it will answer each received UWB radio pulse with another UWB radio pulse, generating a "round trip". Upon subtracting out a fixed delay and dividing by two, a one-way trip time may be determined. Multiplying by the speed of light gives the range. Position estimates may be improved by combining UWB estimates with inertial measurements. Additional details are provided in the following detailed descriptions of the accompanying figures.

FIG. 1 illustrates a block diagram showing a mobile robotic device 100 in accordance with one embodiment of the present disclosure. As shown in FIG. 1, the robotic device 100 may include a sensor portion 110, a control portion 120 operably connected to the sensor portion, and a transport portion 130 operably connected to the control portion. It should be noted that the elements as shown in FIG. 1 are shown by way of example only.

The sensor portion 110 may include various components, such as one or more transceiver nodes or tags 112. The sensor portion 110 may additionally or alternatively include other various sensor mechanisms, such as sonar assemblies, a laser-based sensor, a global positioning system (GPS) device, a microwave sensor, and other similar sensors. The control portion 120 may include a processor 122 and a tangible computer readable medium 124 such as a hard drive, an optical drive, a flash drive, a read-only memory or a random access memory. The transport portion 130 may include a mechanical system of wheels or an electromechanical system, for example, for moving the robotic device from one place to another.

The components of the robotic device 100 as described may be configured to perform a wide variety of operations. The processor 122 may monitor and controls various operations of the robotic device 100. The computer readable medium 124 may be configured to store a wide variety of instructions and/or data used by the processor 122 as well as the other components of the robotic device 100.

The block diagram of FIG. 1 illustrates various operating components of the robotic device 100. It should be appreciated that the operating components of the robotic device 100, or select operating components of the robotic device, may be encased or enclosed in a suitable body or body portion. Alternatively, it should be appreciated that the operating components of the robotic device 100 may simply be suitably disposed on a support framework or structure.

Figure 2:
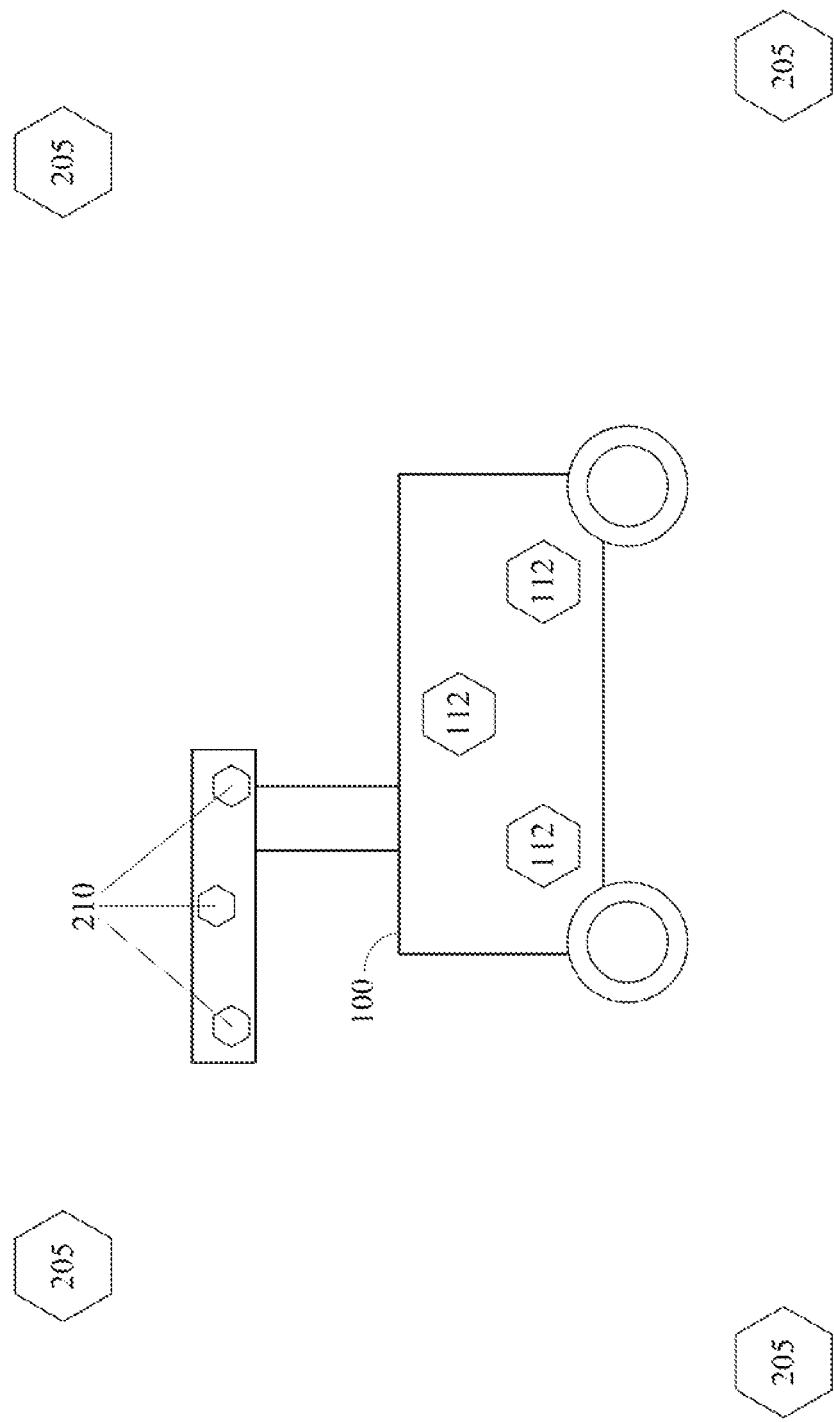
FIG. 2 depicts an illustrative sample of a set of robot and/or end effector UWB transceiver tags used to determine the robot's or end effector's pose according to an embodiment.

FIG. 2 depicts an illustrative example of possible robot and/or end effector UWB transceiver tags used to determine the robot's or end effector's pose. A particular environment 200, e.g., an office building or a warehouse, may include a plurality of anchor nodes 205. As used herein, an anchor node refers to a computing device configured to transmit and receive ranging messages from other anchor nodes. Additionally, one or more anchor nodes may be operably connected to an additional computing device or system for performing additional computations, such as mapping or precise location determination.

A robotic device, such as robotic device 100 as described in FIG. 1, may be positioned within or traveling through environment 200. As described above, the robotic device 100 may include a plurality of transceiver tags 112. Additionally, a tool or end effector operably attached to the robotic device 100 may include one or more transceiver tags 210. As described in greater detail below, by measuring multiple ranging signals between the anchor nodes 205 and the transceiver tags 112, 210, and performing additional calculations, a precise location and pose of the robotic device 100 within the environment 200 may be determined.

It should be noted that in FIGS. 1 and 2 the location of the transceiver tags 112, 210 on the robotic device and end effector are shown by way of example only, and actual placement locations may vary based upon the robotic device design and implementation. For example, a particular design may include the transceiver tags being separated as far from each other as possible within the constraints of the robotic device or end effector. Similarly, the location of anchor nodes 205 within environment 200 may vary based upon the particular environment. For example, the anchor nodes 205 may be positioned along the floor of a building at certain intervals (e.g., every ten feet), or positioned in various other locations such as in corners, at doorways, on objects such as shelves or furniture, or other similar locations as would be practical and beneficial for the location and pose determination techniques described herein.

Figure 3:
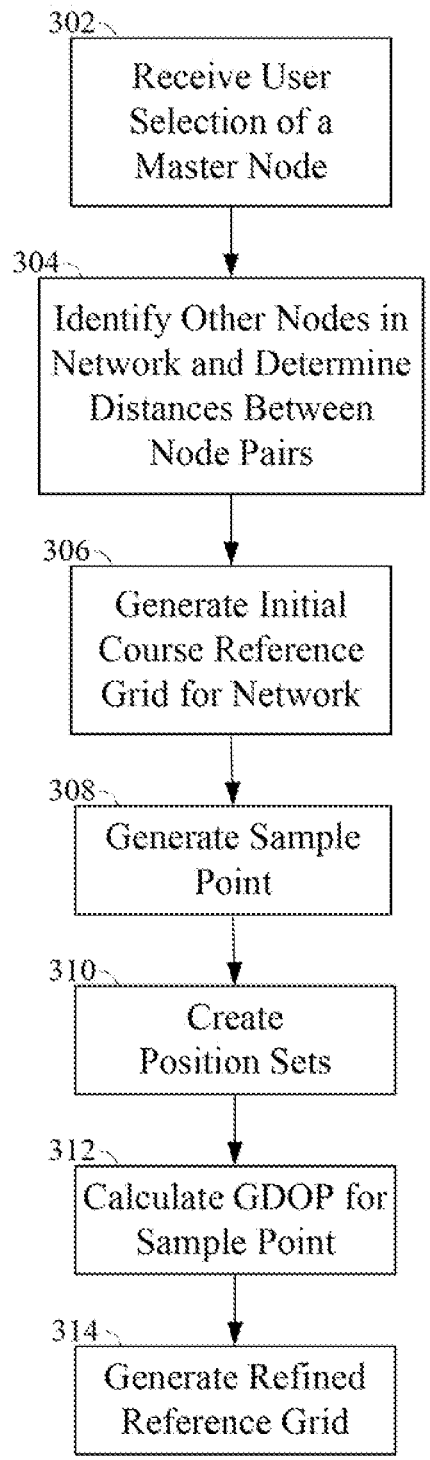
FIG. 3 depicts a flow diagram illustrating a sample method for autonomously establishing an RF-based reference grid without restriction on or precise location knowledge of the location of UWB transceivers according to an embodiment.

FIG. 3 depicts a flow diagram of a sample process for autonomously establishing an RF-based reference grid without restrictions on the location of UWB anchor transceiver nodes (e.g., anchor nodes 205 as shown in FIG. 2) or prior knowledge of their precise location. Thus, a new installation of anchor nodes may be quickly setup and configured, or changes to existing anchor nodes may be quickly determined and recorded.

The process as shown in FIG. 3 is based on the concepts of positioning/localization through the use of trilateration. Precision in location is achieved primarily through the use of UWB or impulse radios as stable reference points and anchor nodes in conjunction with procedures to minimize random location error.

Initially, at least one of the anchor nodes may receive 302 a user selection that one anchor node is to act as a master node. This selection may be arbitrary and, based upon the programming and operation of the individual anchor nodes, may have no effect on the operation of the overall system. In an embodiment, this selection is made via a switch position that indicates whether a specific anchor node was selected as the master node. In a specific embodiment, only one anchor node may be selected as an active master node per network. However, depending upon the implementation of the network, additional anchor nodes may be available as backup master nodes in the event that the user-selected master node becomes non-operational.

The master node may identify 304 other anchor nodes in the network and determine distances between one or more anchor node pairs using ranging messages. For example, the master node may use various communications protocols such as 802.15.4 (2011) to join the network of anchor nodes and identify 304 all member nodes of the network. Once identified, the master node uses the facilities of modern protocols such as 802.15.4 (2011) in a ranging mode to determine the distance from itself to each of the other nodes in the network based upon range message timing as described above.

Based upon the information as determined related to the member nodes, the master node may generate 306 an initial course reference grid for the network, including an estimated position for each member node. Various approaches are available for generating 306 the initial reference grid. For example, the master node may select the two nearest nodes (as determined based upon the ranging message response times as described above) to create an initial coarse grid with itself as the origin point (designated A). The master node may then define a vector from itself to the nearest node (designated B) to establish an x-axis. The master node may then define a vector to the second nearest node (designated C) to establish an x-y plane. The master node may then instruct the nearest node B to determine its distance to second nearest node C. Based upon this distance information, the master node may define a triangle having the master node at the origin on a plane passing through all three nodes. Thus, a position in the grid may be designated as a three-tuple (x, y, z), thus indicating a specific position for each anchor node in a coordinate plane. The master node may define node A (i.e., itself) as having the position (0, 0, 0), node B as having the position ($d_{AB}$, 0, 0), and node C as having the position ($c_1$, $c_2$, 0), where $d_{ij}$ is the distance between the $i^{th}$ and $j^{th}$ node. Then, the coordinates of node C ($c_1$, $c_2$, 0) may be defined through the geometry of the triangle formed by the three nodes A, B and C as $$c_1 = (d_{AC}^2 - d_{BC}^2 + d_{AB}^2)/2d_{AB}$$

and $$c_2^2 = d_{AC}^2 - c_1^2.$$

Having determined the position of node C, the master node may calculate an approximate position in the reference grid of all of the other nodes in the network based on trilateration with nodes A, B, and C. In an embodiment, upon determining the location of all anchor node positions, the master node may distribute the position of the anchor nodes in the network to the other anchor nodes over a shared communications channel. In an alternative embodiment, the master node may distribute the locations of known anchor node positions as positions become known.

As described above, the master node may determine an initial position estimate of each node in the RF reference system without any significant understanding of the geometric relationship of the nodes. Thus, the master node may initiate a refinement to the reference grid to minimize geometric dilution of position accuracy. To further refine the reference grid, the master node may generate 308 a virtual sample point in space from which to assess geometric relationships. For example, one possible location of this point is $((d_{AB}+c_1)/2, 0.618034c_2, 0)$. Using such a location, the master node may place a reference sample point roughly equidistant between anchors B and C on the x-y plane within the arc formed by the three anchors nodes. In the above location, the coefficient of $c_2$ is the inverse of the golden mean of distance along the y-axis. By generating 308 the sample point using this location, the master node may insure that the reference sample point remains within range of the anchor nodes but is not coincident with any of the anchor nodes.

Based upon the refined reference grid, the master node may create 310 position sets for the reference sample point within the network. To create 310 the position sets, the master node may estimate the distance from the reference sample point to each of the anchor nodes in the network. The master node may then take a set of, for example, the six anchor nodes closest to the reference sample point, and organize them into up to 15 possible "best anchor sets" for the reference point, i.e., the combination of 6 things (the six closest anchor nodes) taken 4 at a time (3 anchor nodes as well as the reference sample point), thus providing a data set C(6,4). It should be noted that six anchor nodes is selected by way of example only. The actual number of anchor nodes selected may be determined based upon timing requirements of the system as well as the overall processing power available at the master node. For example, if an excessively large number of anchor nodes is selected for the best anchor set, the network may suffer lag and real-time measurements and location services may be delayed accordingly.

The master node may use the initially estimated position of each set of possible anchors to calculate 312 a geometric dilution of precision (GDOP) for the reference sample point. As used in location determination, GDOP refers to the multiplicative effect of various factors on positional measurement precision.

Depending upon its implementation and programming, the master node may use one of several techniques for calculating 312 the GDOP for the reference sample point. For example, the master node may assume that the measurement/distance estimation variances for each best anchor set are equal to each other. Then, the master node can approximately estimate the GDOP as being inversely proportional to the volume enclosed by the anchor nodes.

More specifically, the master node may calculate 312 the GDOP by first letting x, y, and z denote the position of the reference sample point, $x_i$, $y_i$, and $z_i$ denote the position of an anchor node, and $R_i$ denote the normed distance to anchor i. The master node may formulate a matrix A as:

$$A = \begin{bmatrix} \frac{(x_1-x)}{R_1} & \frac{(y_1-y)}{R_1} & \frac{(z_1-z)}{R_1} & -1 \\ \frac{(x_2-x)}{R_2} & \frac{(y_2-y)}{R_2} & \frac{(z_2-z)}{R_2} & -1 \\ \frac{(x_3-x)}{R_3} & \frac{(y_3-y)}{R_3} & \frac{(z_3-z)}{R_3} & -1 \\ \frac{(x_4-x)}{R_4} & \frac{(y_4-y)}{R_4} & \frac{(z_4-z)}{R_4} & -1 \end{bmatrix}$$

and $Q = (A^T A)^{-1}$.

The master node may calculate that the positional dilution of precision (PDOP)=SQRT($s_x^2 + s_y^2 + s_z^2$), and that the temporal dilution of precision (TDOP)=SQRT($s_t^2$) where $s_f^2$ are the spatial elements of the Q diagonal, and $s_t^2$ represents the temporal element of the Q diagonal. Then, the master node may calculate 312 that GDOP=SQRT(PDOP$^2$+TDOP$^2$), thus providing a GDOP for a specific reference sample point.

It should be noted that the calculation method shown above is provided by way of example only and, based upon the requirements and resources available, the calculation method may be altered accordingly. For example, if the ranging signals are adequately synchronized such that the time uncertainty between ranging measurements is sufficiently small, the above calculations may be simplified to reflect only the positional considerations and use only three anchor positions and PDOP as the metric, thus eliminating calculation of TDOP.

The master node may identify the set of anchor nodes associated with the lowest GDOP. Using this new, more geometrically appropriate set of anchor nodes, the master node may select an anchor node to act as an origin of a new RF-based reference grid. The new origin node may repeat the same grid establishment process previously performed by the master node to generate 314 a refined reference grid, and may distribute the position of all anchor nodes in the new, more accurate, reference grid.

When a robotic device with a transceiver tag enters the operating region of the anchor nodes, a master tag associated with the robotic device may broadcast a request to join the network. This request may be transmitted according to a specific communication protocol such as by the IEEE Standard 802.15.4. The master node may accept the request message and provide a media access address followed by a reference grid position for each of the anchor nodes in the network. Additionally, the master node may issue a ranging request to the robotic device master tag, as well as the other anchor nodes, to establish the pair-wise range between the tag and each of the anchor nodes. This process is explained in greater detail in the following description of FIG. 4.

Figure 4:
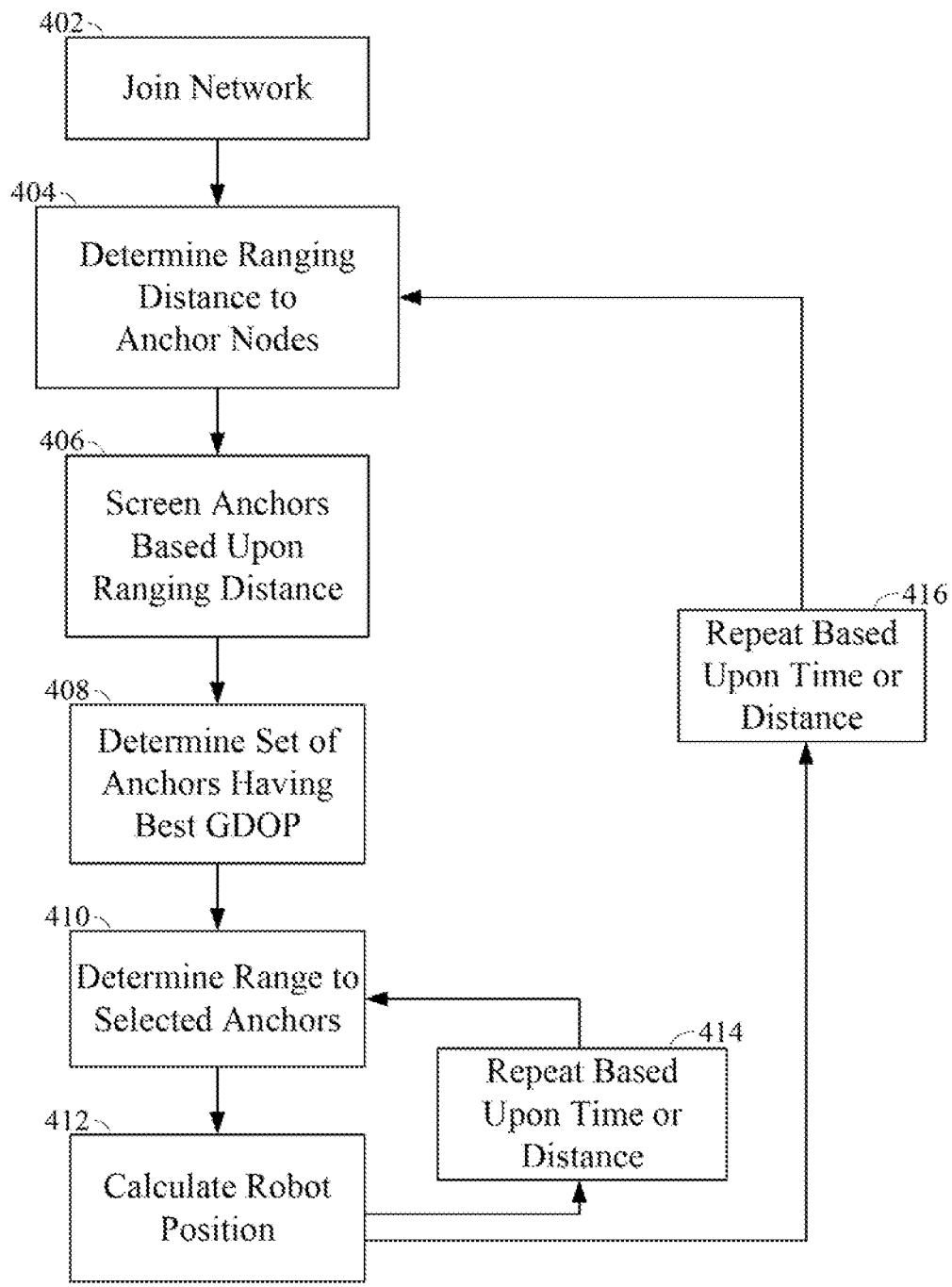
FIG. 4 depicts a flow diagram illustrating a sample method for estimating and retaining a precise location of an individual UWB tag according to an embodiment.

FIG. 4 depicts a flow diagram of a process for estimating and retaining currency of the precise location of an individual UWB transceiver tag on, for example, a robotic device. The process as described in FIG. 4 uses many of the same techniques described above in reference to FIG. 3.

Upon entering an area with a UWB network or upon system initialization, a master tag associated with, for example, a robotic device may transmit 402 a request to join the network. The master node may respond to the request by identifying all anchor nodes in the network. Thus, the master tag may acquire the location of the anchor nodes within the network from the network master node or, alternatively, by collecting information on its own as part of the network entry process.

The master tag may determine 404 ranging distances to each of the identified anchor nodes using methods such as the echo ranging mode of IEEE standard 802.15.4 (2011). The master tag may screen 406 its list of anchor nodes to identify, for example, the 6 closest anchor nodes and prepare a list of the combinations of the 6 anchor nodes taken four at a time. As described above in greater detail in reference to FIG. 3, the master tag may calculate the GDOP for each set of potential anchor nodes and determine 408 a set of anchor nodes as its reference anchor nodes. The master tag may then determine 410 a ranging distance to the selected set of reference anchor nodes by confirming the initial ranging information of distance to the reference anchor nodes.

Based upon the ranging information, the master tag may calculate 412 its precise position within the network based on multi-lateration methods. For example, the master tag may use a hyperbolic position location algorithm method to provide an estimate of the master tag position. The master tag may combine the position estimate with inertial information from additional sensors on the robotic device to improve overall precision or reduce the frequency of equation solving. For example, the master tag may use a linear quadratic estimation such as a Kalman filter to improve position estimation by reducing jitter. Typically, a linear quadratic estimation such as a Kalman filter uses a series of measurements over time, the measurements including noise and other inaccuracies, to produce precise estimates of unknown variables. Thus, the master tag can calculate 412 a more precise position measurement.

To further improve the position measurement, the master tag may repeat 414 the calculation. The repetition rate may be based on, for example, time or distance Thus, the calculations may be repeated at a higher frequency when the robotic device is moving quickly (i.e., at a time when position is changing rapidly). Additionally, the specific type of environment may dictate which criterion is best for determining repetition frequency. Similarly, the master tag may repeat 416 the anchor node selection process to update the anchor node information.

Figure 5:
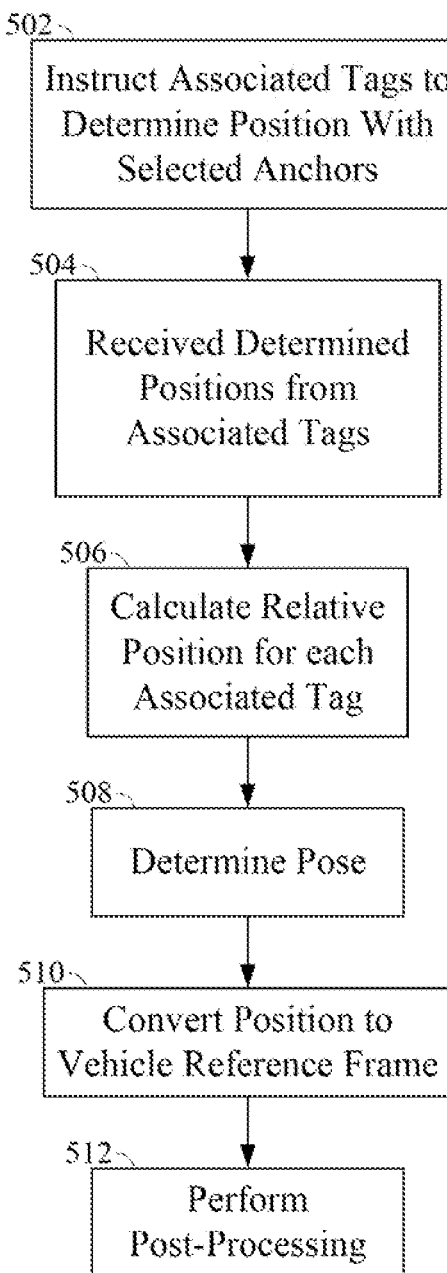
FIG. 5 depicts a flow diagram illustrating a sample method for estimating the pose of a robotic system or an end effector associated with that robotic system according to an embodiment.

FIG. 5 depicts a flow diagram of a method to estimate the pose of a robotic device or an end effector associated with that robotic system. Having determined the best nodes to use from, for example, the process as described in reference to FIG. 4, the robotic device master tag communicates the anchor node selection to all other transceiver tags directly associated with the robotic device. These additional transceiver tags provide information for determining the pose of the robotic device. The additional transceiver tags exist in known positions on the robot and are defined in terms of the robot reference system. Thus, the robot platform reference frame may have its origin defined as the robotic device master tag with the x-axis oriented along the positive nominal direction of travel, the z-axis oriented along the gravity vector and the y-axis orthogonal to the other two axes in accordance with the normal right hand coordinate system. All additional transceiver tag locations may thus be expressed in, for example, Cartesian coordinates with reference to this system.

The robotic device master tag may instruct 502 the associated transceiver tags to determine their position with respect to the selected anchor node starting sequentially at time $t_0$. Thus, at time $t_0$, each transceiver tag may sequentially send ranging messages to the designated anchor nodes as described above. The anchor nodes respond in turn with the data necessary to perform the TDOA calculation. The master tag may receive 504 the determined position information from the associated transceiver tags. Since the range messages under IEEE 802.15.4 are so short, the measurements appear to be taken synchronously and represent a near-instantaneous snapshot of the relative position of each transceiver tag.

The robotic device master tag may calculate 506 a relative position for each associated transceiver tag. For example, the robotic device master tag may subtract the position of the master tag from the position of each associated transceiver tag in the base reference system to give the relative position of all robot tags in the robot-centered reference frame. The master tag may further calculate by using the $\arctan(y_i/x_i)$ to give the yaw of the robotic device with respect to the base reference grid, $\arctan(z_i/x_i)$ to give the pitch of the robotic device, and $\arctan(z_i/y_i)$ to give the roll of the robotic device. With this information, the master tag may describe the position and orientation in all 6 degrees of freedom. Based upon this information, the master tag may further determine 508 the pose of the robotic device. For example, the master tag may accurately determine 508 a position and orientation of a tool or end effector associated with the robotic device. Optionally, the master tag may convert 510 the position and orientation information from the RF reference frame to a robotic vehicle reference frame such that the position and orientation information related to the pose is expressed relative to the robotic device.

Additionally, the master tag may optionally perform post-processing. For example, it may be noted that a portion of the near-instantaneous range estimates may have associated errors. Many of the error sources may be Gaussian or random. To improve the position and orientation accuracy the master tag may utilize a 3-d accelerometer (incorporated, for example, as part of an inertial navigation system (INS)) and a Kalman Filter.

An INS may be divided into a sensor part (including, for example, an inertial measurement unit (IMU)) and a computations part. The IMU may include a MEMS tri-axial accelerometer whose readings are fed into a Kalman filter. For example, the Kalman filter gain for such a system may be represented as:

$$K_{l,k}=P_k H_{l,k}^T (H_{l,k} P_k H_{l,k}^T + R_k)^{-1}$$

and the error covariance may be represented as:

$$P_k := (I_{n \times m} - K_{l,k} H_{l,k}) P_k.$$

By using the Kalman filter in conjunction with the IMU, the master tag may significantly stabilize the position and orientation process, and reduce any associated estimation error. Such an approach is also rather insensitive to initial conditions as the process converges quickly and stably.

Figure 6:
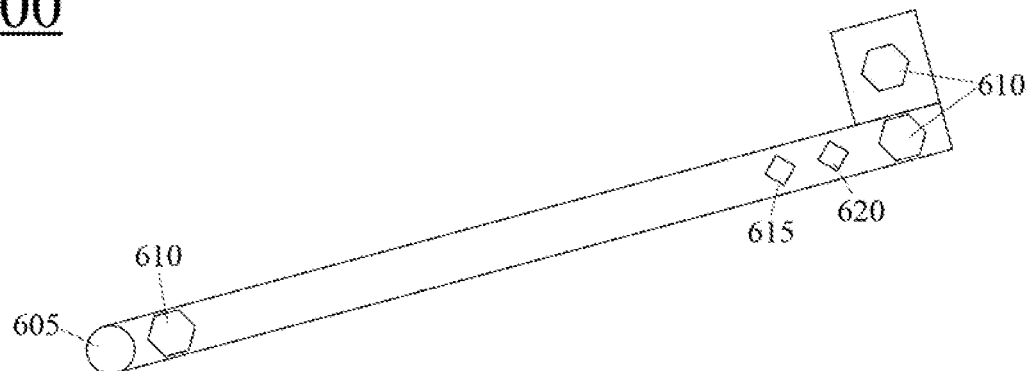
FIG. 6 depicts an illustration of a sample location identifying stylus (LIS) or wand used to designate locations and/or lines of interest according to an embodiment.

FIG. 6 depicts an illustration of a location identifying stylus (LIS) 600 or wand used to designate locations and or lines of interest in a specific environment such as an office building or a warehouse. The stylus 600 may include a long handle terminating in a tip 605. Multiple stylus transceiver tags 610 may be mounted at various positions on the stylus 600. The stylus 600 may further include a training indicator 615 and a marking indicator 620, each of which provides an input device for a user of the stylus to indicate one or more desired functions. A sample process for operating the stylus 600 is described in reference to FIG. 7 below.

Figure 7:
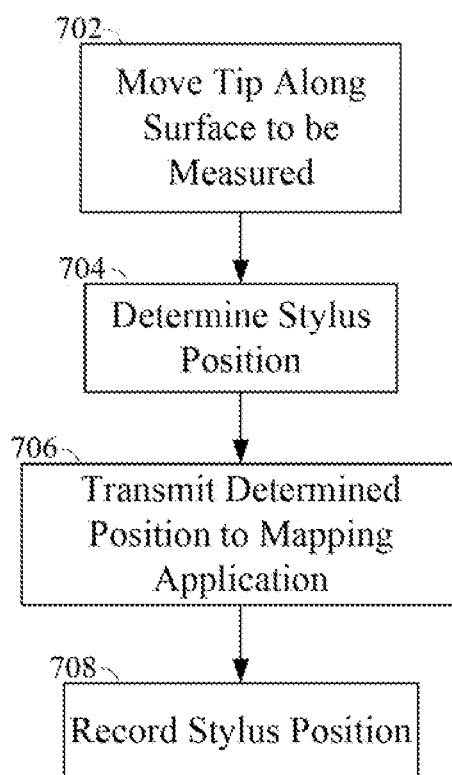
FIG. 7 depicts a flow diagram illustrating a sample method to create a digital map in the UWB-based reference grid using a digital stylus according to an embodiment.

FIG. 7 depicts a flow diagram illustrating a sample process to create a digital map in the UWB reference grid using a digital stylus such as stylus 600. An operator may move the tip of the stylus along a line or surface with the train indicator depressed to create a digital map on an associated computing system running a mapping application. The location/orientation capability contained in the stylus determines the location of the tip. The components for determining the pose of the stylus, and in turn the position of the tip, could include a position/location/orientation system containing multiple tags such as those described in FIG. 5 for the robot pose system, or a minimal set of position/location sensors augmented with a 3-d accelerometer mounted at a known position on the stylus. The master stylus tag may act as the master tag as described in FIG. 5, communicating with the anchor nodes forming the RF reference grid.

An operator may move 702 the stylus tip along a surface or intended boundary mark with a training indicator asserted. The stylus master tag may determine 704 its position and orientation using the same methods as an end effector described above in reference to FIG. 5. The stylus master tag may thus determine 704 the tip position based on the position and orientation information available, and may transmit 706 the tip position to an associated mapping application. The stylus may continue to transmit 706 the information until the operator provides an indication to stop marking. A processing device associated with the mapping application may receive this information and record 708 the tip position as data in an evidence grid, continually updating the evidence grid until the stylus stops transmitting updated position information. The processing device may then use the evidence grid data to create or update a digital representation of the map.

Figure 8:
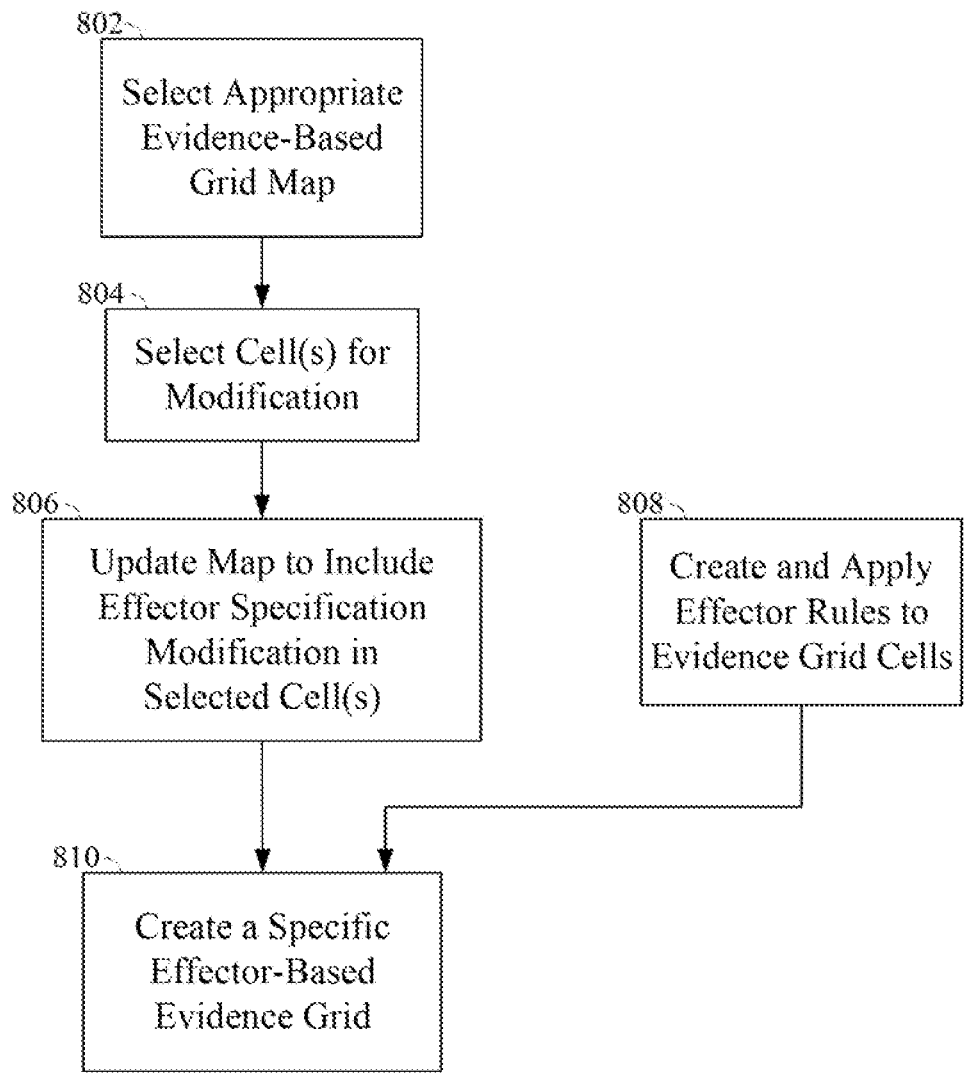
FIG. 8 depicts a flow diagram illustrating a sample method to establish a pose restriction on digital maps in a way that they can be interpreted as location or orientation constraints for the robot's end effector according to an embodiment.
Figure 9:
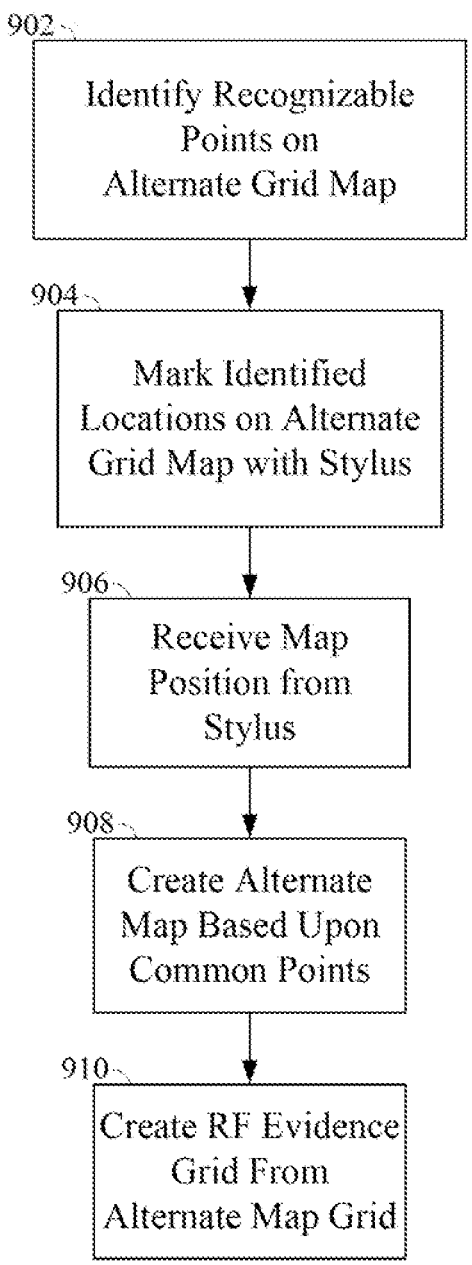
FIG. 9 depicts a flow diagram illustrating a sample method to correlate an RF-based grid from a different reference digital map according to an embodiment.

FIG. 8 depicts a method to establish pose restriction for a robot or end effectors by defining one or more rules within a digital map such as a map created using the process as described in reference to FIG. 7 above. Such a process allows for identification of areas of interest within the map where operation of the robotic device or its associated end effector should be modified accordingly. An operator may select 802 an appropriate evidence-based grid map as a starting point for detailed instruction processing. This digital map processing may enable the inclusion or deletion of information and control or orientation instructions in a digital map. The digital map processing may include processing software running on a commercial computing device to enhance a digital map of an area of interest such that the mapping application is manipulated and enhanced.

The operator may select 804 one or more cells within the map to receive modifications using any of a range of possible user interface techniques. The processing device running the mapping application may update 806 the map to add information to the evidence grid based on the robot or effector to be employed in the selected cells. This information is recorded as additional evidence in each grid cell to incorporate offset and orientation information that can be used by the robotic device and/or end effector to identify the robot approach commands. For example, a store shelf that has a small kick space that should be accounted for in cleaning. This kick space can be defined as additional information added to that grid cell within the digital map. Similarly, a flower bed edge may be indicated within a grid cell such that an end effector overshoots the flower bed edge by one inch to ensure adequate trimming.

Additionally, the processing device running the mapping application may optionally create 808 and apply end effector rules to one or more evidence cells, reducing manual entry of guidance appropriate for specific end effectors. Based upon the updated information, the processing device may create 810 a version of the map for each type of end effector or guidance directive that contains necessary navigation information to be used by a navigation planning system on board the robotic device such that all indicated areas of interest and map modifications are identified and recognized by the robotic device.

The techniques as described herein may be used to incorporate operation of a robotic device to an existing map as well. FIG. 6 depicts a flow diagram of a sample process for correlating an RF-based grid from a different reference digital map. In addition to maps generated by an electronic stylus, other maps can be processed and used. The electronic map software converts floor plans and other maps to an electronic map format that can be enhanced by the user by adding additional constraint lines, offsets or orientation information.

The processing device running the mapping application may identify and incorporate the locations of at least three anchors or identify at least 3 recognizable points on the alternate map. If the stylus process is used (e.g., the process as described above in FIG. 7), the operator of the stylus may mark 904 the identified location by touching the stylus tip to the location and asserting the mark indicator. The processing device may receive 906 the map position information from the stylus and mark the position on the digital map.

The processing device may create 908 an alternative map based upon common recognizable points. For example, the processing device may align the RF map with the alternate map using a least squares process. To align the maps, the processing device may adjust the coordinates of the map to bring, for example, the master node and position of the master node indicated on the electronic map into convergence. The position of the anchor node nearest to the master node for both the RF reference grid and the electronic grid may then be identified. The processing device may then geometrically rotate the referenced electronic map to bring the nearest anchor nodes into alignment.

The transformation used to bring about this translation and rotation forms the mapping function comprising the coordinate system transformation between the electronic map and the RF reference grid. Based upon the transformation information, the processing device may create 910 an RF evidence grid from the alternate map grid and store the updated map.

Thus, using the processes and techniques as described above, a robotic device may be accurately tracked through a specific environment and a pose of the robotic device, or a tool or other end effector of the robot, can be accurately determined. Additionally, by incorporating the stylus and mapping techniques, custom maps may be created that include identified areas of interest where standard operation of the robotic device, or an end effector associated with the robotic device, should be altered. Additionally, by using the stylus and/or existing maps, digital representations of environments can be quickly and accurately created, thus further facilitating operation of the robotic device.

Figure 10:
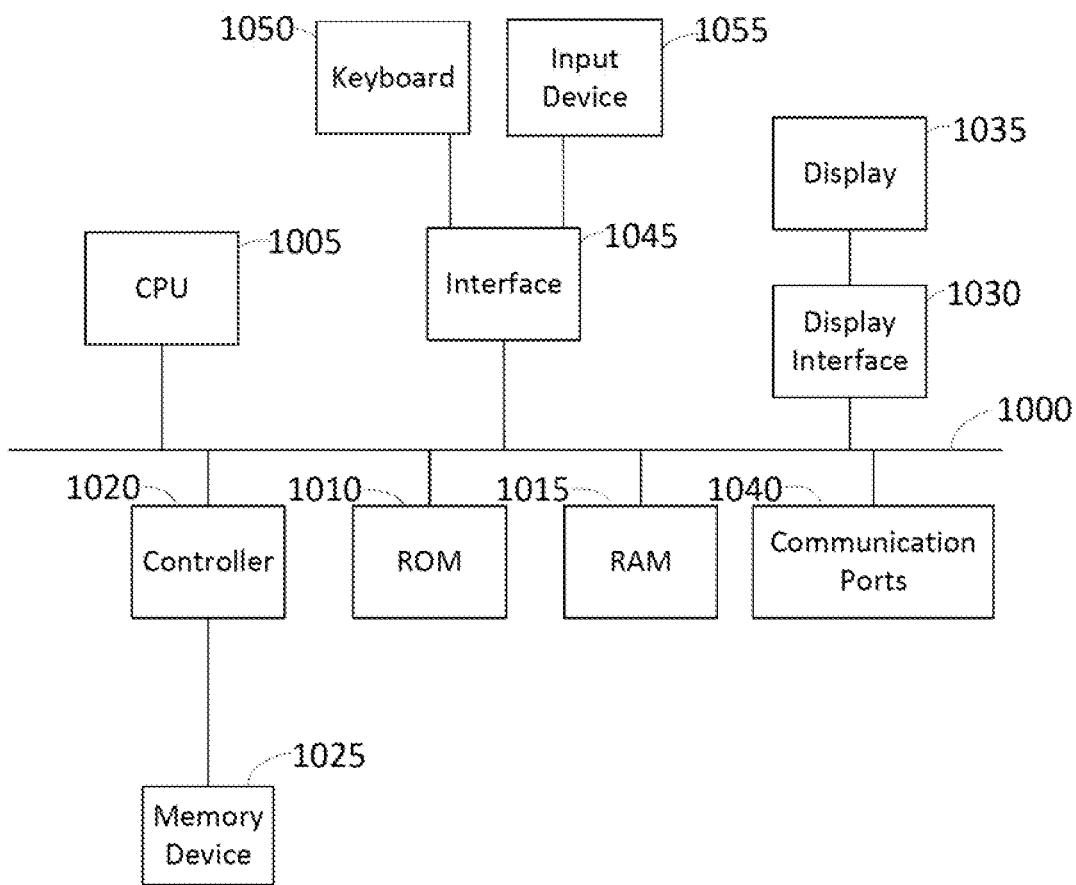
FIG. 10 depicts various embodiments of a computing device for implementing the various methods and processes described herein.

FIG. 10 depicts a block diagram of exemplary internal hardware that may be used to contain or implement the various computer processes and systems as discussed above. A bus 1000 serves as the main information highway interconnecting the other illustrated components of the hardware. CPU 1005 is the central processing unit of the system, performing calculations and logic operations required to execute a program. CPU 1005, alone or in conjunction with one or more of the other elements disclosed in FIG. 10, is an exemplary processing device, computing device or processor as such terms are used within this disclosure. Read only memory (ROM) 1010 and random access memory (RAM) 1015 constitute exemplary memory devices.

A controller 1020 interfaces with one or more optional memory devices 1025 to the system bus 1000. These memory devices 1025 may include, for example, an external or internal DVD drive, a CD ROM drive, a hard drive, flash memory, a USB drive or the like. As indicated previously, these various drives and controllers are optional devices. Additionally, the memory devices 1025 may be configured to include individual files for storing any software modules or instructions, auxiliary data, incident data, common files for storing groups of contingency tables and/or regression models, or one or more databases for storing the information as discussed above Program instructions, software or interactive modules for performing any of the functional steps associated with the processes as described above may be stored in the ROM 1010 and/or the RAM 1015. Optionally, the program instructions may be stored on a tangible computer readable medium such as a compact disk, a digital disk, flash memory, a memory card, a USB drive, an optical disc storage medium, such as a Blu-Ray™ disc, a distributed or "cloud-based" storage system, and/or other recording medium.

An optional display interface 1030 may permit information from the bus 1000 to be displayed on the display 1035 in audio, visual, graphic or alphanumeric format. Communication with external devices may occur using various communication ports 1040. An exemplary communication port 1040 may be attached to a communications network, such as the Internet or a local area network.

The hardware may also include an interface 1045 which allows for receipt of data from input devices such as a keyboard 1050 or other input device 1055 such as a mouse, a joystick, a touch screen, a remote control, a pointing device, a video input device and/or an audio input device.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for determining a position of a robotic device within an environment, the method comprising:
    transmitting, by a master transceiver tag associated with the robotic device, a request to join a network, the network comprising at least one master node and a plurality of anchor nodes;
    receiving, by the master transceiver tag, distance information for at least a portion of the master node and the plurality of anchor nodes;
    determining, by the master transceiver tag, a set of best fit anchor nodes based upon the distance information;
    determining, by the master transceiver tag, ranging information from the master transceiver tag to each of the set of best fit anchor nodes;
    calculating, by the master transceiver tag, a position of the robotic device based upon the determined ranging information;
    receiving, by the master transceiver tag, relative positioning information from a plurality of additional transceiver tags operably attached to the robotic device;
    calculating, by the master transceiver tag, a location for each of the plurality of additional transceiver tags based upon the received relative positioning information and the position of the robotic device; and
    determining, by the master transceiver tag, a pose of the robotic device based upon the calculated location of each of the plurality of additional transceiver tags.

2. The method of claim 1 wherein transmitting the request to join the network is initiated upon an entry of the robotic device into an operating region of the plurality of anchor nodes.

3. The method of claim 1 wherein transmitting the request to join the network comprises transmitting the request in accordance with a predefined communication protocol.

4. The method of claim 3, wherein the predefined communication protocol is IEEE Standard 802.15.4.

5. The method of claim 1, wherein calculating the position of the robotic device is performed utilizing, at least in part, a multi-lateration method.

6. The method of claim 5, wherein the multi-lateration method comprises a hyperbolic position location algorithm.

7. The method of claim 5, wherein the multi-lateration method comprises a linear quadratic estimation algorithm.

8. The method of claim 7, wherein the linear quadratic estimation algorithm comprises a Kalman filter.

9. The method of claim 1, wherein the steps of receiving relative positioning information from the plurality of additional transceiver tags, calculating the location for each of the plurality of additional transceiver tags and determining the pose of the robotic device based upon the calculated location of each of the plurality of additional transceiver tags are performed at a repetition rate based, at least in part on at least one of a time and a distance.

* * * * *

UNITED STATES PATENT AND TRADEMARK OFFICE
CERTIFICATE OF CORRECTION

PATENT NO. : 10,539,647 B2  
APPLICATION NO. : 15/632718  
DATED : January 21, 2020  
INVENTOR(S) : Larry J. Williams It is certified that error appears in the above-identified patent and that said Letters Patent is hereby corrected as shown below:

In the Specification

Column 10, Line 51, delete "$P_k$:" and insert -- $P_k$ --, therefor.

Column 10, Line 58, delete "and or" and insert -- and/or --, therefor.

Column 13, Line 17, delete "above" and insert -- above. --, therefor.

Column 13, Line 25, delete "Blu-Ray™" and insert -- Blu-ray™ --, therefor.

Signed and Sealed this  
Twenty-third Day of June, 2020

Andrei Iancu  
*Director of the United States Patent and Trademark Office*